United States Patent
Hayase

(10) Patent No.: US 10,974,993 B2
(45) Date of Patent: Apr. 13, 2021

(54) CALCINED GYPSUM TREATMENT DEVICE AND CALCINED GYPSUM TREATMENT METHOD

(71) Applicant: YOSHINO GYPSUM CO., LTD., Tokyo (JP)

(72) Inventor: Ken Hayase, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 200 days.

(21) Appl. No.: 16/070,076

(22) PCT Filed: Jan. 31, 2017

(86) PCT No.: PCT/JP2017/003418
§ 371 (c)(1),
(2) Date: Jul. 13, 2018

(87) PCT Pub. No.: WO2017/135250
PCT Pub. Date: Aug. 10, 2017

(65) Prior Publication Data
US 2019/0016633 A1 Jan. 17, 2019

(30) Foreign Application Priority Data
Feb. 2, 2016 (JP) .............................. JP2016-017625

(51) Int. Cl.
*C04B 11/00* (2006.01)
*C04B 11/028* (2006.01)
(Continued)

(52) U.S. Cl.
CPC ......... *C04B 11/007* (2013.01); *B01J 19/0013* (2013.01); *B01J 19/20* (2013.01);
(Continued)

(58) Field of Classification Search
CPC .. C04B 11/007; C04B 11/0285; C04F 11/366; C01P 2006/82; B01J 19/013;
(Continued)

(56) References Cited

U.S. PATENT DOCUMENTS 2,848,210 A * 8/1958 Compton ............ C04B 11/0285
423/172
3,829,280 A * 8/1974 Jenne ...................... C04B 11/02
432/58
(Continued)

FOREIGN PATENT DOCUMENTS

CA   3012594 A1 * 8/2017 .......... B01J 19/0013
EP   2116294 A1 * 11/2009 ......... C04B 11/0283
(Continued)

OTHER PUBLICATIONS

Patent Abstract of Canada, Publication No. 2 807 961, published Mar. 8, 2012 (Corresponds to Ref. AC & AH) Abstract.
(Continued)

*Primary Examiner* — Stephen M Gravini
(74) *Attorney, Agent, or Firm* — Staas & Halsey LLP

(57) ABSTRACT

A calcined gypsum treatment apparatus has an agitating type of cooler provided with a cooling region for cooling the calcined gypsum, and a moisture supplying device for incorporating moisture into the calcined gypsum. The moisture supplying device includes a humid gas-feeding port which introduces humid gas including moisture or steam, directly into the cooling region. The calcined gypsum is introduced through a calcined gypsum introduction port into the cooling region, and the moisture is incorporated into the calcined gypsum to modify the calcined gypsum. The humid gas-feeding port is positioned in vicinity to the calcined gypsum introduction port so as to allow the spouted or delivered flow of the humid gas to be brought into contact
(Continued)

with the calcined gypsum immediately after introduced into the cooling region.

7 Claims, 9 Drawing Sheets

(51) Int. Cl.
| | |
|---|---|
| *F27D 15/02* | (2006.01) |
| *B01J 19/00* | (2006.01) |
| *B01J 19/20* | (2006.01) |
| *C01F 11/46* | (2006.01) |
| *F26B 9/00* | (2006.01) |
| *F26B 21/04* | (2006.01) |

(52) U.S. Cl.
CPC ........ *C01F 11/466* (2013.01); *C04B 11/0285* (2013.01); *F27D 15/0273* (2013.01); *C01P 2006/82* (2013.01); *F26B 9/00* (2013.01); *F26B 21/04* (2013.01)

(58) Field of Classification Search
CPC ......... B01J 19/20; F27D 15/0273; F26B 3/00; F26B 9/00; F26B 21/00; F26B 21/04
USPC .............................................................. 34/90
See application file for complete search history.

(56) References Cited

U.S. PATENT DOCUMENTS

| | | | | |
|---|---|---|---|---|
| 4,120,737 A * | 10/1978 | Berrie | ................. | C04B 11/00 |
| | | | | 106/772 |
| 4,201,595 A | 5/1980 | O'Neill | | |
| 4,485,077 A * | 11/1984 | Martinez | ............... | C01B 25/225 |
| | | | | 241/15 |
| 5,320,677 A * | 6/1994 | Baig | ..................... | C04B 11/024 |
| | | | | 106/780 |
| 5,437,850 A * | 8/1995 | Kroehl | ..................... | B01J 6/001 |
| | | | | 423/171 |
| 7,748,888 B2 * | 7/2010 | Bold | ........................ | B01F 9/06 |
| | | | | 366/24 |
| 8,251,695 B2 * | 8/2012 | Falinower | ................. | F27D 3/08 |
| | | | | 432/58 |
| 8,793,897 B2 * | 8/2014 | Brosig | .................. | C04B 11/007 |
| | | | | 34/303 |
| 9,897,376 B2 * | 2/2018 | Nakata | ...................... | F26B 3/20 |
| 10,371,444 B2 * | 8/2019 | Nakata | .................... | F26B 17/32 |
| 10,556,806 B2 * | 2/2020 | Gocke | .................. | C01F 11/466 |
| 2006/0010711 A1 * | 1/2006 | Falinower | ........... | C04B 11/0281 |
| | | | | 34/443 |
| 2006/0010895 A1 * | 1/2006 | Bolind | .................. | C04B 11/007 |
| | | | | 62/259.4 |
| 2011/0150750 A1 * | 6/2011 | Goecke | .................... | B01J 6/002 |
| | | | | 423/555 |
| 2019/0016633 A1 * | 1/2019 | Hayase | ............... | C04B 11/0285 |

FOREIGN PATENT DOCUMENTS

| | | | | |
|---|---|---|---|---|
| EP | 3284723 A1 * | 2/2018 | ............. | B01J 6/004 |
| JP | 3-51665 | 8/1991 | | |
| JP | 2002-249317 | 9/2002 | | |
| JP | 2011-522766 | 8/2011 | | |
| JP | 4847855 | 10/2011 | | |
| JP | 2013-535401 | 9/2013 | | |
| JP | WO2017135250 A1 * | 11/2018 | ............. | B01J 19/20 |
| WO | WO-2009135688 A1 * | 11/2009 | ............. | B01J 6/002 |
| WO | WO 2012/028251 A1 | 3/2012 | | |
| WO | WO-2017135250 A1 * | 8/2017 | ......... | C04B 11/0285 |
| WO | WO-2018033491 A1 * | 2/2018 | ............. | B01J 6/004 |

OTHER PUBLICATIONS

International Search Report dated Apr. 4, 2017 in corresponding International Patent Application No. PCT/JP2017/003418.
Translation of the Written Opinion of the International Searching Authority dated Apr. 4, 2017 from International Application No. PCT/JP2017/003418, 3 pages.

\* cited by examiner

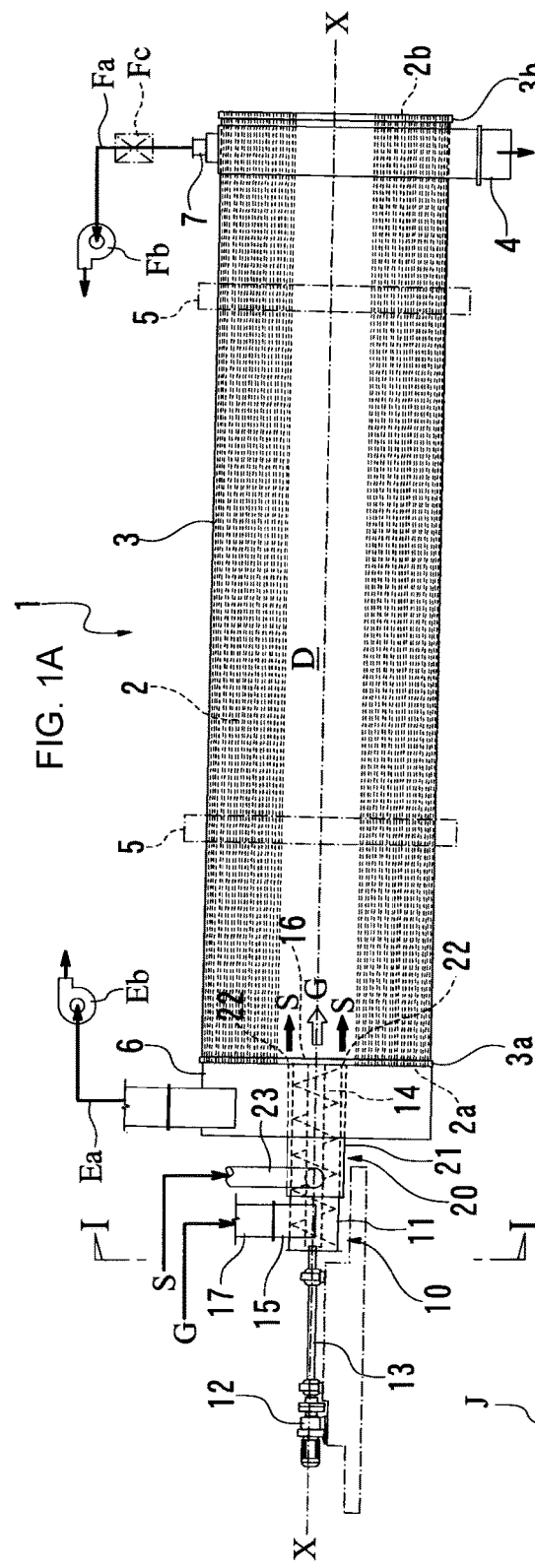
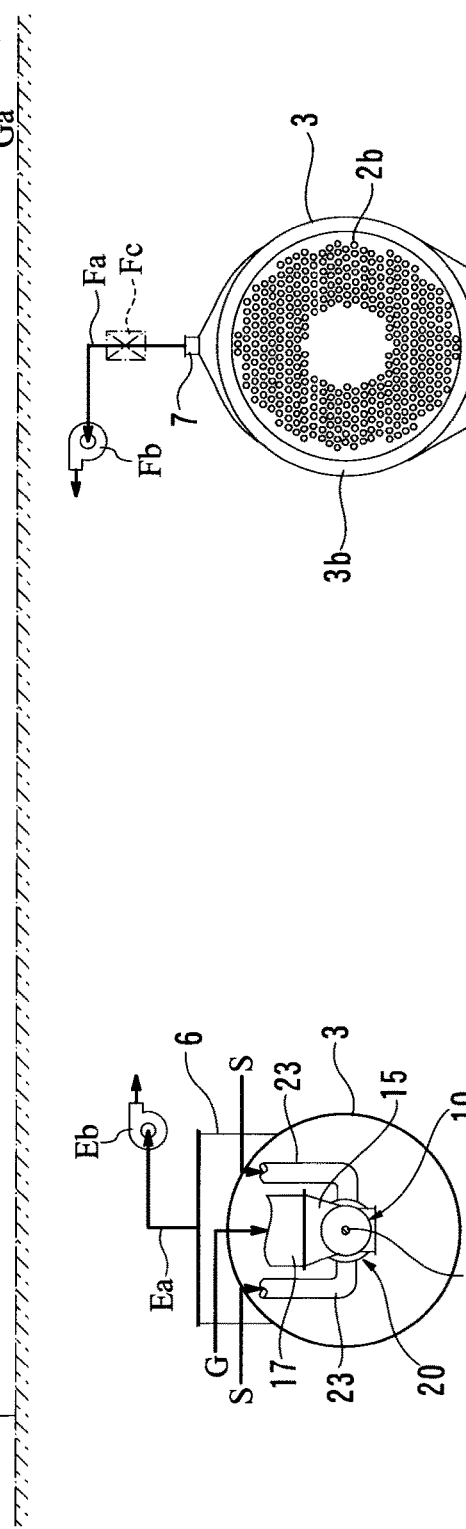

[FIG.2]
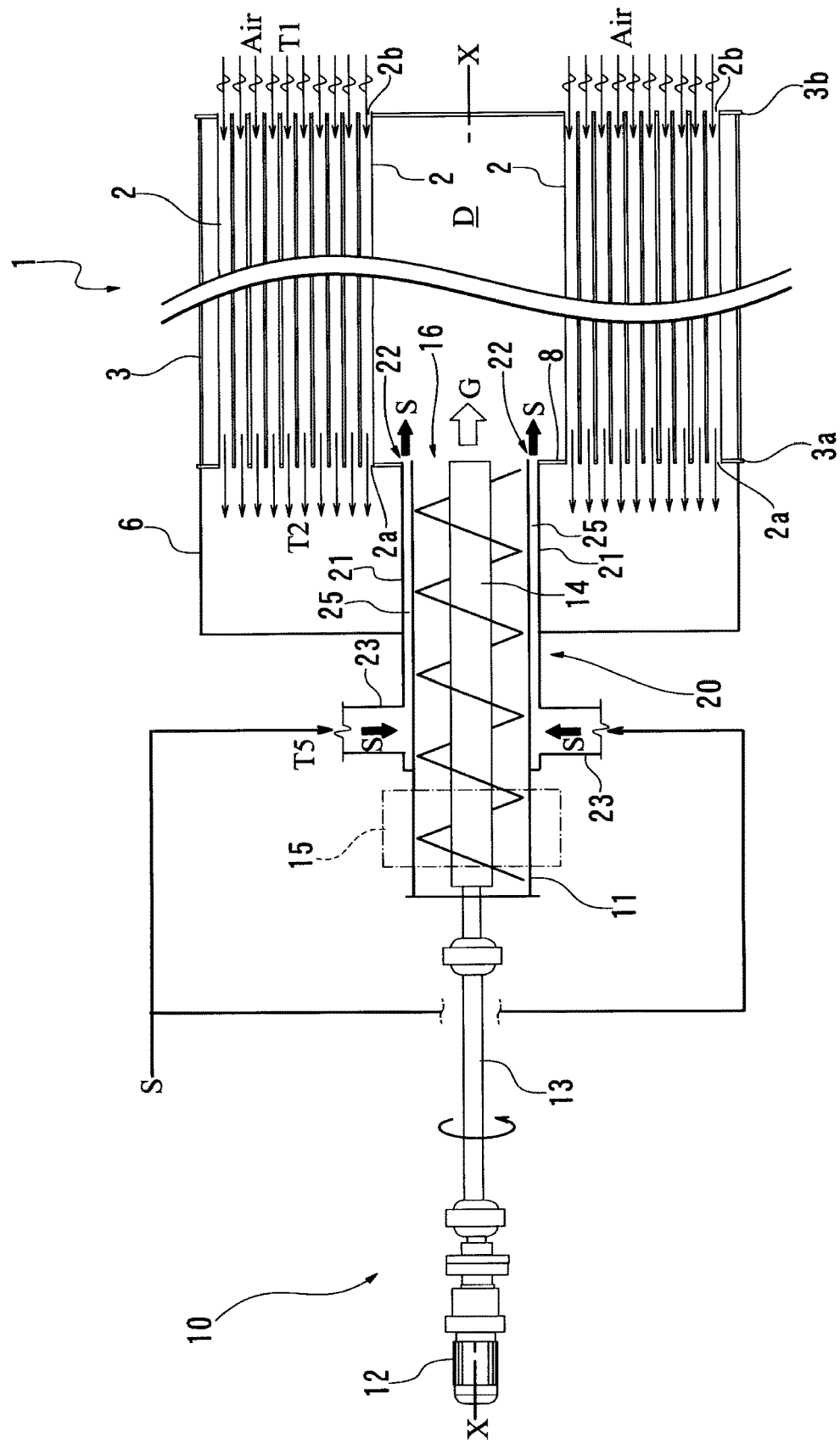

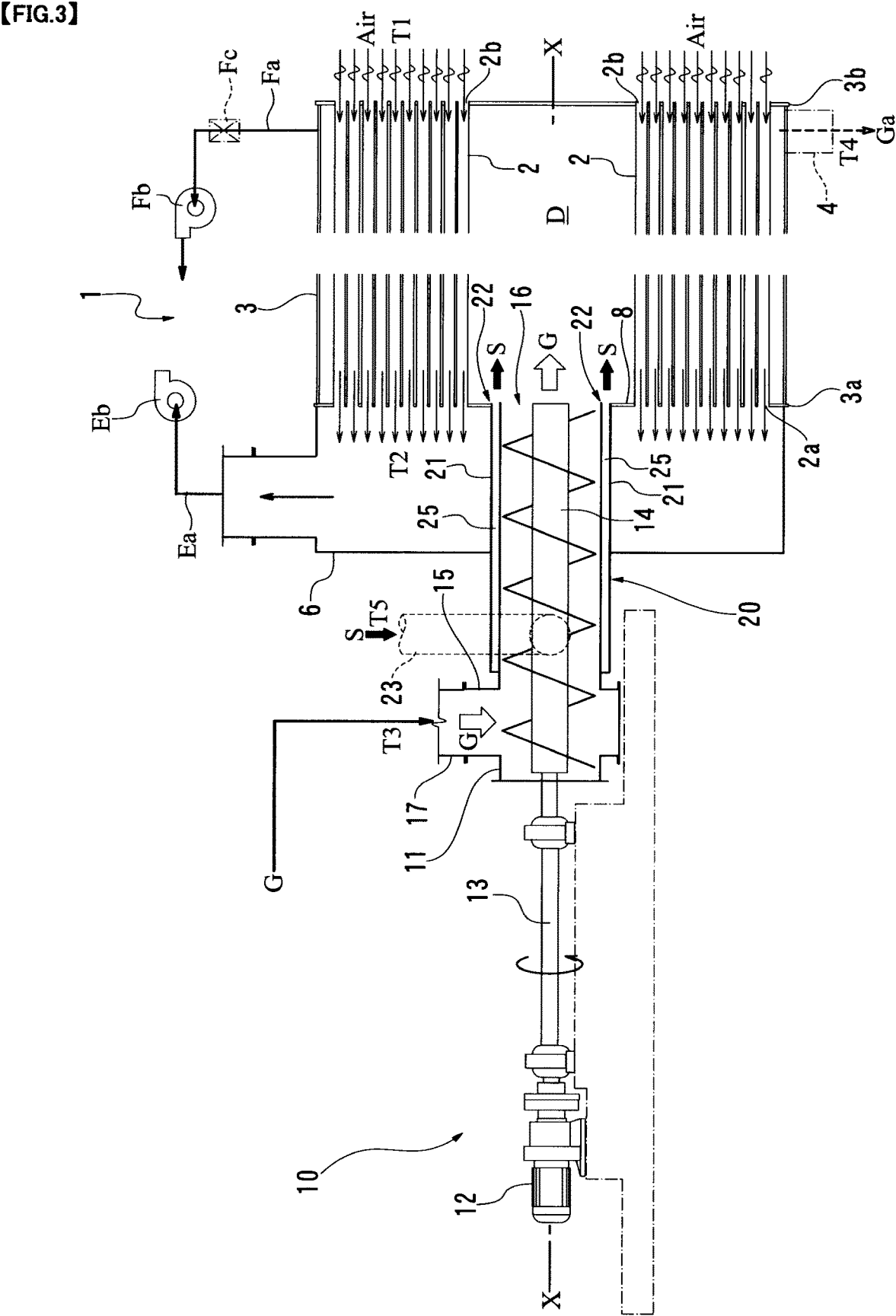
[FIG.3]

[FIG.4]
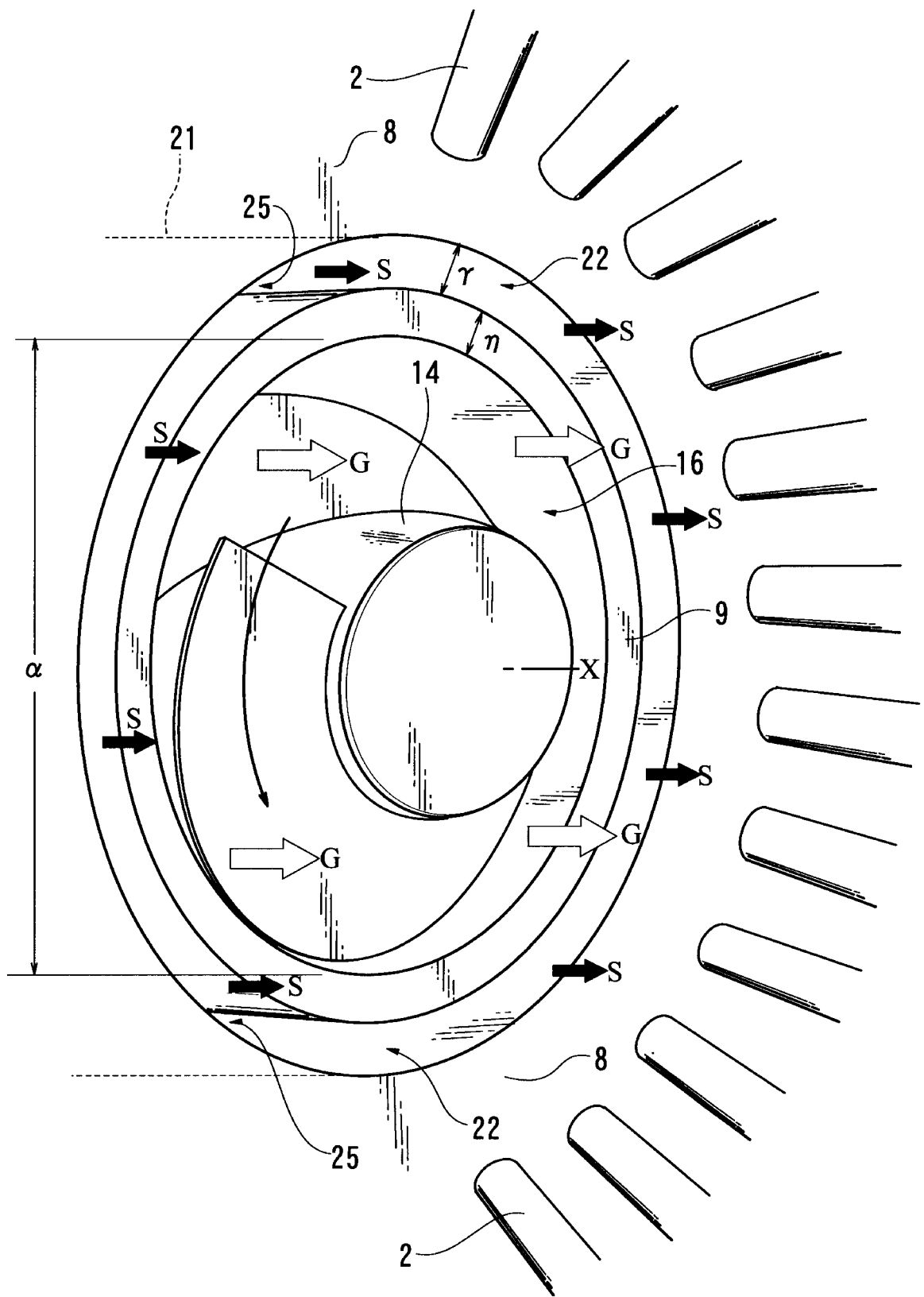

【FIG.5】
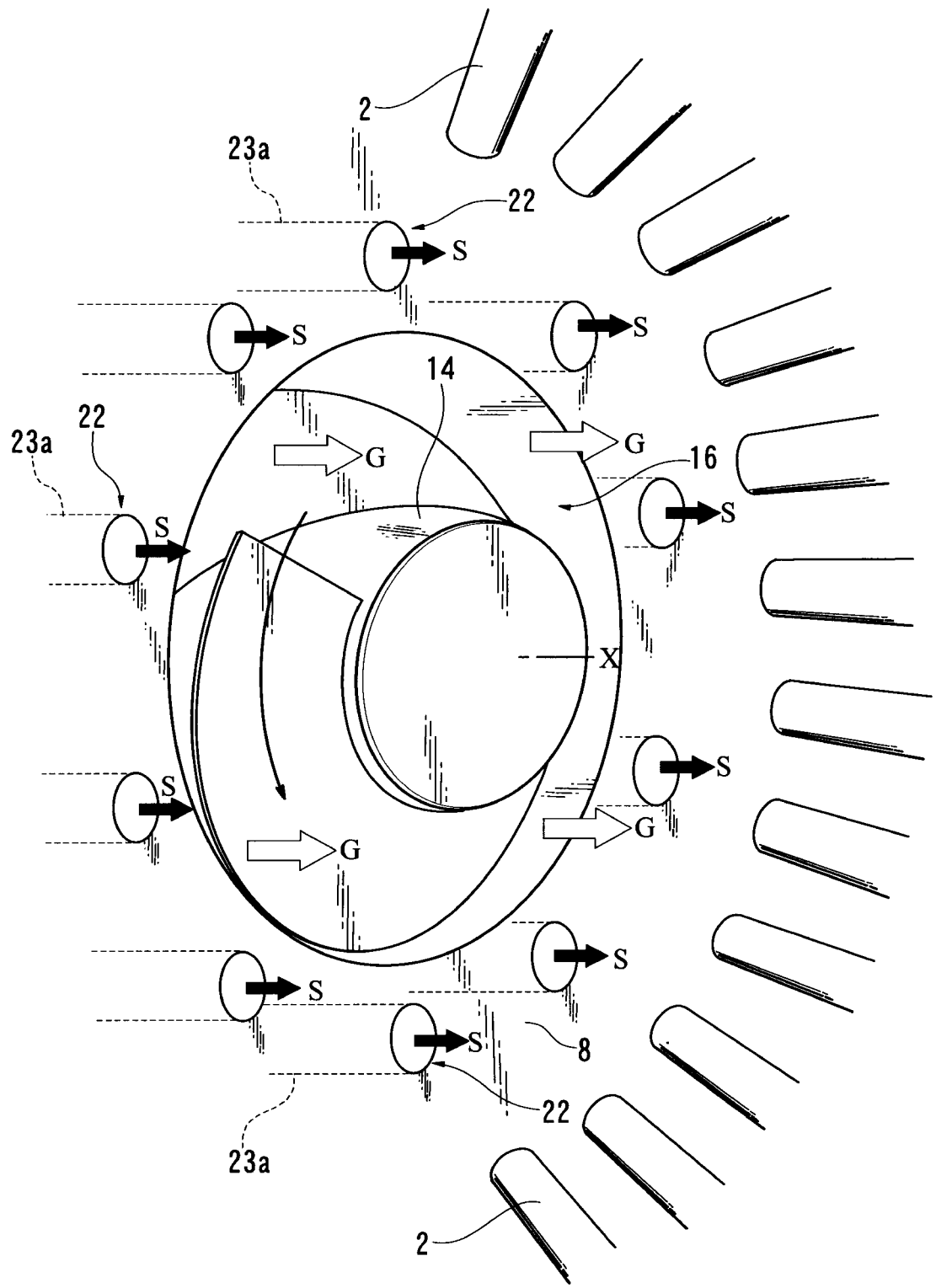

[FIG.6]
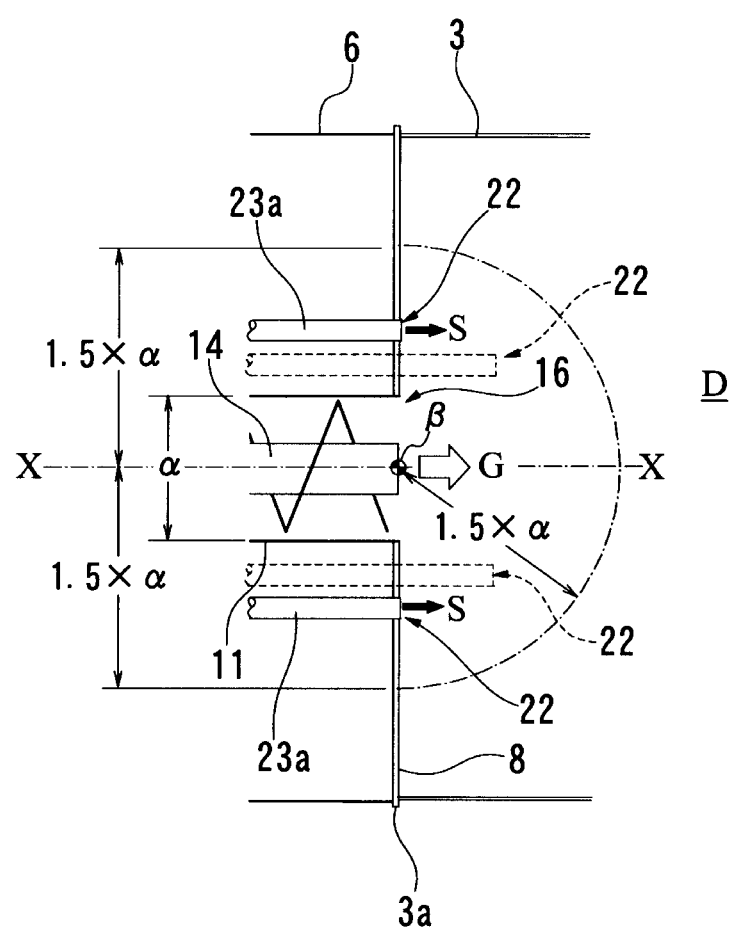

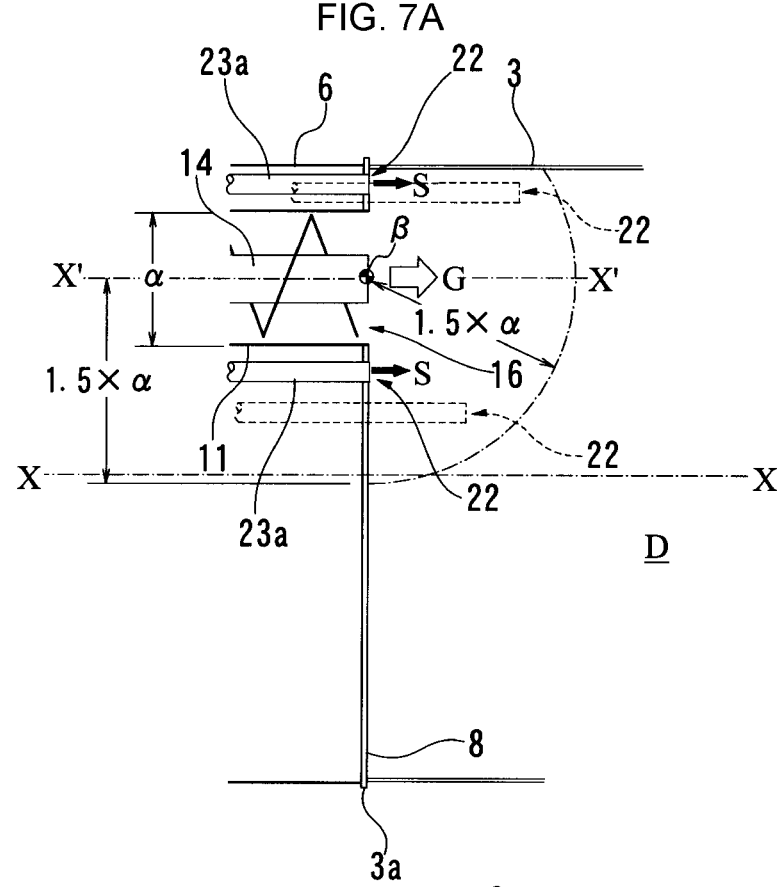
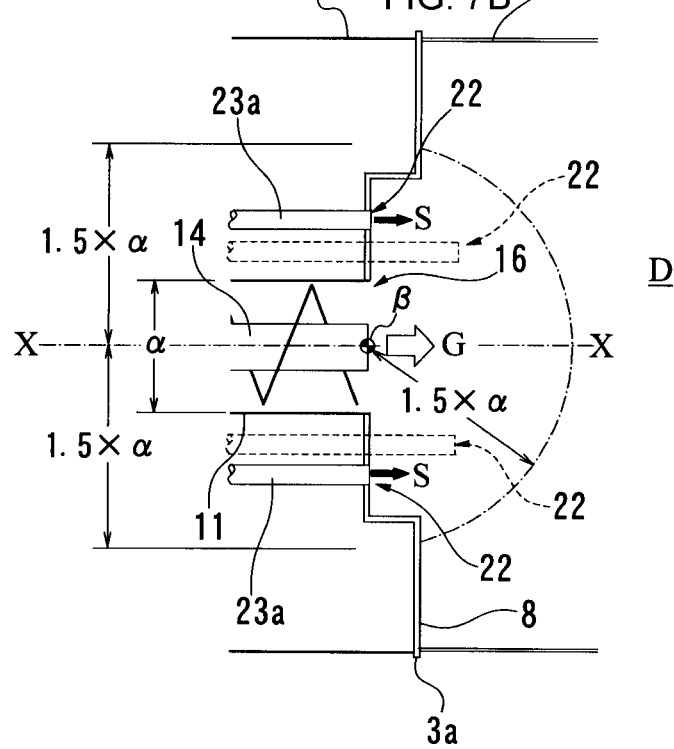

[FIG.8]
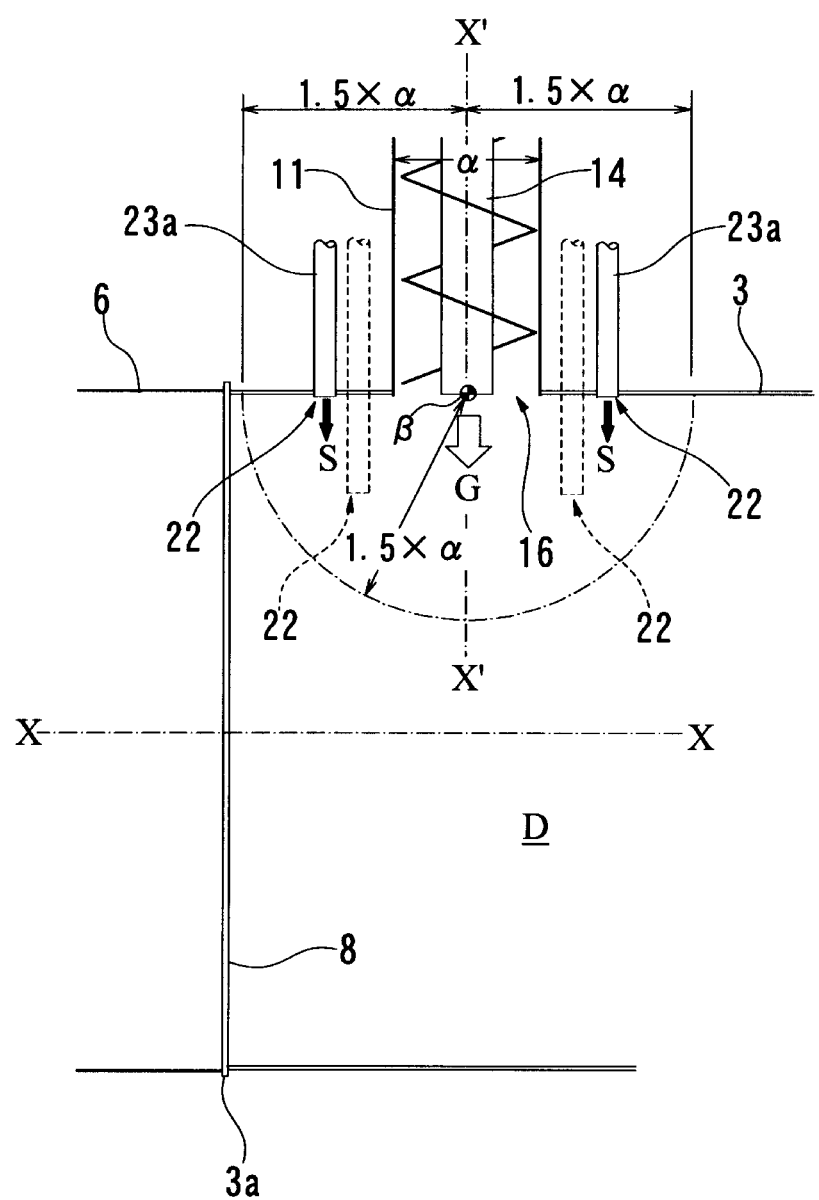

[FIG.9]
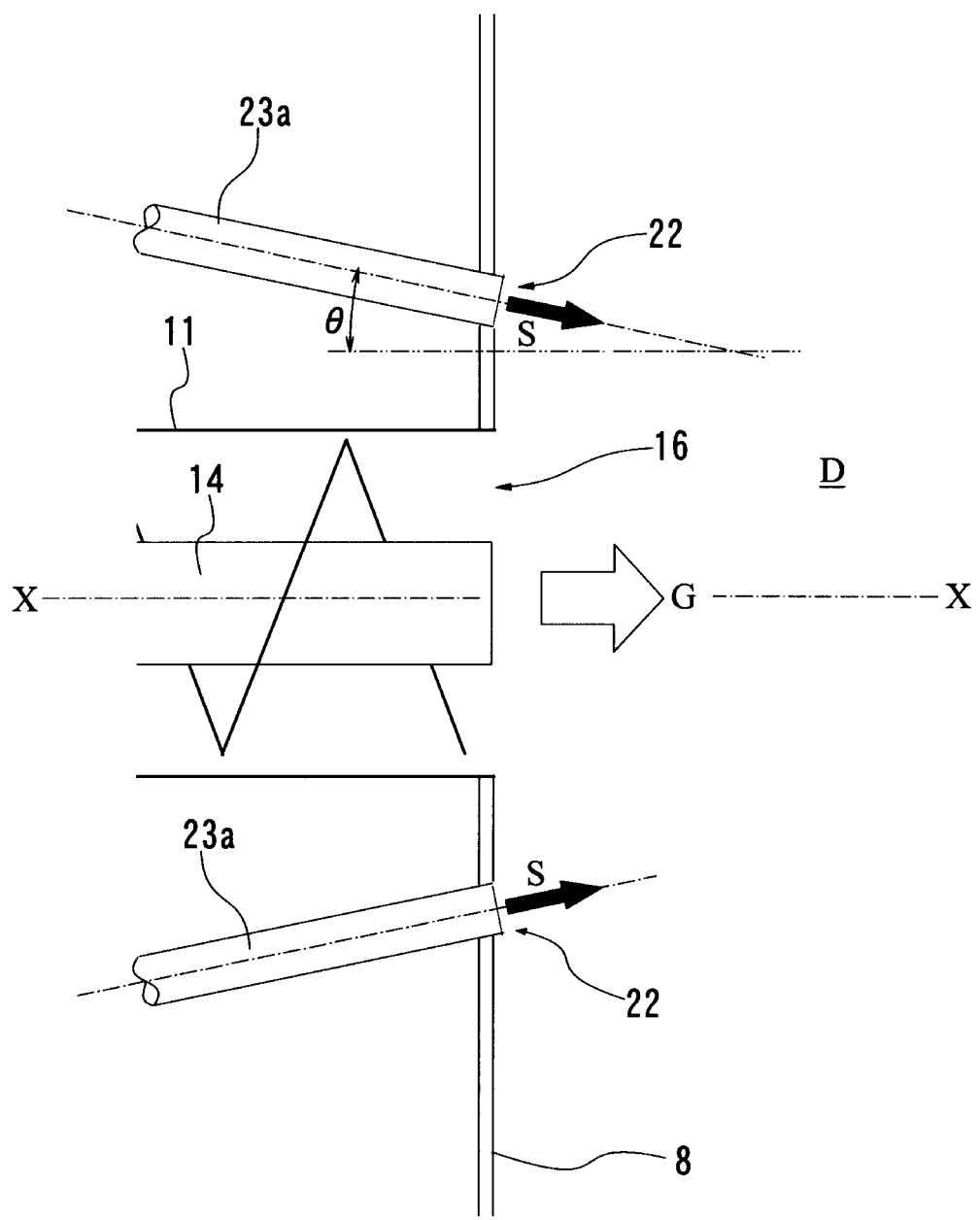

CALCINED GYPSUM TREATMENT DEVICE AND CALCINED GYPSUM TREATMENT METHOD

This application is a U.S. National Stage Application, which claims the benefit under 35 U.S.C. § 371 of International Patent Application No. PCT/JP2017/003418 filed on Jan. 31, 2017, which claims the foreign priority benefit under 35 U.S.C. § 119 of Japanese Patent Application No. 2016-017625, filed Feb. 2, 2016, the contents of which are incorporated herein by reference.

TECHNICAL FIELD

The present invention relates to a calcined gypsum treatment apparatus and a calcined gypsum treatment method, and more specifically, such an apparatus and method that enables reduction of the amount of mixing water required for slurrying the calcined gypsum, by incorporating moisture into the calcined gypsum beforehand.

BACKGROUND ART

The calcined gypsum (stucco or calcined plaster) is produced by a calcination process in which raw gypsum, such as natural gypsum or chemical gypsum, is calcined solely, or a mixture of different kinds of raw gypsum is heated (calcined). Calcium sulfate dihydrate ($CaSO_4 \cdot 2H_2O$), which is a principal component of the raw gypsum, is converted to calcium sulfate hemihydrate ($CaSO_4 \cdot \frac{1}{2}H_2O$) by the calcination process. The combined water (crystallized water) content of the calcium sulfate dihydrate and the content of the calcium sulfate hemihydrate are 20.9 wt % and 6.2 wt % (theoretical values), respectively. In general, the calcined gypsum obtained by the calcination process further includes III type anhydrous gypsum ($CaSO_4$) and so forth.

The calcined gypsum has a property where the calcined gypsum is slurried by adding an appropriate amount of water thereto and stirring it together with water, thereby being dihydrated and rapidly solidified by a hydration reaction. Therefore, the calcined gypsum is used as a raw material for producing various kinds of gypsum based products. For example, a gypsum board is known as a typical product produced from the calcined gypsum. In general, the gypsum board is a board or panel for building construction work, which is manufactured by pouring gypsum slurry into a space between upper and lower sheets of paper for gypsum board liner and forcibly drying and cutting it wherein the gypsum slurry is produced by mixing and stirring the calcined gypsum with water and adding thereto adhesive auxiliary agent, set accelerator, foam, and so forth.

In such a step of mixing and stirring the calcined gypsum, water and so on, the III type anhydrous gypsum included in the calcined gypsum has a property of increasing the amount of mixing water required for slurrying the calcined gypsum (referred to as "the amount of mixing water for slurrying the calcined gypsum" or "the amount of mixing water" hereinafter). In the manufacturing process of gypsum boards, an increase of the amount of mixing water tends to result in an increase in the loss of heat during a forcibly drying step. Therefore, from a viewpoint of environment load reduction, energy saving measures, and so forth, it is desirable to preliminarily convert the III type anhydrous gypsum to the calcium sulfate hemihydrate before slurrying the calcined gypsum, thereby reducing the amount of mixing water for slurrying the calcined gypsum.

As a technical approach for reducing the amount of mixing water for slurrying the calcined gypsum, it is disclosed in Japanese patent laid-open publication No. 2013-535401 (Patent Literature 1) that, in order to eliminate crystal defects and surface defects of the calcined gypsum, process gas (high temperature and high humidity gas) generated in a furnace or reaction vessel of a calciner is delivered through a fluid passage together with the calcined gypsum, and the calcined gypsum and the process gas are introduced into a gypsum plaster cooler. In this technique, a stabilization zone is provided on an upstream side of a cooling zone of the cooler, and the process gas of the calciner, including a relatively large amount of moisture (steam), is introduced into the stabilization zone together with the calcined gypsum, so that the III type anhydrous gypsum in the calcined gypsum is converted to the calcium sulfate hemihydrate in the stabilization zone by the moisture in the process gas. The calcined gypsum modified or reformed by supply or addition of the moisture is cooled in the cooling zone provided with an air-cooling type of heat exchanger.

As another technical approach for reducing the amount of mixing water for slurrying the calcined gypsum, it is known in the art that the amount of mixing water in the mixing and stirring step is reduced by incorporating water into the calcined gypsum before the mixing and stirring step. For instance, a healing treatment is known in the art, in which a small amount of water (approximately 1 to 10 wt % (weight ratio)) is incorporated into the calcined gypsum before being slurried in order to prevent the particles of the calcined gypsum from causing excessive disintegration and water solubility in a slurrying step (Japanese Patent Publication No. 3-51665 (Patent Literature 2) and Japanese Patent Publication No. 4847855 (Patent Literature 3)).

CITATION LIST

Patent Literatures

[Patent Literature 1] Japanese patent laid-open publication No. 2013-535401
[Patent Literature 2] Japanese Patent Publication No. 3-51665
[Patent Literature 3] Japanese Patent Publication No. 4847855

SUMMARY OF INVENTION

Technical Problem

The modifying or reforming technique for the calcined gypsum as described above is intended to modify or reform the calcined gypsum by incorporating moisture or water into the calcined gypsum, for (1) converting the III type anhydrous gypsum to the calcium sulfate hemihydrate; (2) modifying the calcined gypsum so as to prevent the particles of the calcined gypsum from causing excessive disintegration and water solubility during slurrying; or modifying the calcined gypsum by both (1) and (2). However, when the calcined gypsum and the above process gas (high temperature and high humidity gas) are conveyed together through the same fluid passage, or when the calcined gypsum is cooled after modified by addition of the humid gas to the calcined gypsum, the atmosphere of the area containing the calcined gypsum after the incorporation of moisture is a humid atmosphere in which a relatively large amount of moisture or steam exists. Therefore, dew condensation of the moisture in the humid atmosphere is apt to occur in a reaction vessel, conduit, or the like, which defines or encloses the area of contact between the calcined gypsum and the moisture, or on an inner surface of a conveyance passage or the like for the modified calcined gypsum, whereby condensed water tends to be produced on an inner surface of the reaction vessel, conduit, conveyance passage, and so on.

When such condensed water is produced on the inner surface of the reaction vessel, conduit, conveyance passage, and so on, the calcined gypsum takes a hydration reaction with the water, so that the calcined gypsum is adhered to or solidified on the inner surface of the vessel, conduit, and so on. This may result in a condition where a cross-section of a fluid passage cannot be sufficiently ensured in the reaction area, the conveyance passage, or the like for the calcined gypsum; therefore, this kind of solidified matter should be removed in a timely manner. However, it is practically very difficult to reliably remove such solidified matter from the inner surface of the reaction vessel, conduit, and so on.

It is an object of the present invention to provide a calcined gypsum treatment apparatus and method that can reliably prevent the condensed water from generating in the area of contact between the calcined gypsum and the moisture, or in the conveyance passage or the like for the modified calcined gypsum, during the modifying process of the calcined gypsum for modifying the calcined gypsum by incorporating the moisture into the calcined gypsum.

Solution to Problem

The present invention provides a calcined gypsum treatment apparatus, which has a moisture supplying device for incorporating moisture into calcined gypsum and an agitating type of cooler provided with a cooling region for cooling the calcined gypsum;
wherein said moisture supplying device includes a humid gas-feeding port which introduces a spouted flow or delivered flow of the humid gas, including moisture or steam, directly into the cooling region;
wherein said cooler is provided with a calcined gypsum introduction port for introducing the calcined gypsum into said cooling region; and
wherein said humid gas-feeding port is positioned in vicinity to said calcined gypsum introduction port so as to cause said spouted or delivered flow of the humid gas to be brought into contact with said calcined gypsum immediately after being introduced into said cooling region.

The present invention also provides a calcined gypsum treatment method, in which calcined gypsum before cooled is brought into contact with moisture and the calcined gypsum is cooled by an agitating type of cooler having a cooling region,
wherein a humid gas-feeding port, which delivers or spouts humid gas including moisture or steam, is positioned in vicinity to a calcined gypsum introduction port of said cooler;
wherein said calcined gypsum is introduced through said calcined gypsum introduction port to said cooling region;
wherein said humid gas is directly introduced into the cooling region through said humid gas-feeding port; and
wherein a spouted or delivered flow of the humid gas of said humid gas-feeding port is brought into contact with said calcined gypsum immediately after being introduced into said cooling region, so as to incorporate the moisture into the calcined gypsum in the cooling region.

According to the present invention, the humid gas is directly introduced into the cooling region of the cooler so that incorporation of the moisture into the calcined gypsum takes place in the cooling region. The spouting flow or delivery flow of the humid gas enters the cooling region through the humid gas-feeding port located in the vicinity of the calcined gypsum introduction port (calcined gypsum charging port). Therefore, the humid gas is brought into contact with the calcined gypsum immediately after being introduced into the cooling region through the calcined gypsum introduction port. The cooling region of the cooler also acts as a region for modifying the calcined gypsum. Accordingly, the calcined gypsum is subjected to both the cooling action and the modifying action, simultaneously. In the treatment method, the humid gas is directly introduced into the cooling region to be in contact with the calcined gypsum in the cooling region (therefore, the humid gas is not in contact with the calcined gypsum in its conveyance passage or the like). Thus, dew condensation water is reliably prevented from being produced in the conveyance passage of the calcined gypsum or the like between a calciner and the cooling region. Furthermore, the spouted or delivered flow of the humid gas, which is released into the cooling region in a relatively large volume, is brought into contact with a relatively large amount of calcined gypsum rapidly and efficiently. Therefore, the moisture in the humid gas is given to the calcined gypsum effectively. Thus, the efficiency in the incorporation of moisture into the calcined gypsum can be improved, and dew condensation of excessive moisture can be prevented from taking place in the cooling region.

Advantageous Effects of Invention

According to the calcined gypsum treatment apparatus and method of the present invention, it is possible to reliably prevent the condensed water from generating within the area of contact between the calcined gypsum and the moisture, or within the conveyance passage or the like for the modified calcined gypsum, during the modifying process of the calcined gypsum for modifying the calcined gypsum by incorporating the moisture into the calcined gypsum.

BRIEF DESCRIPTION OF THE DRAWINGS

FIG. 1(A) is a side elevational view showing an overall construction of a calcined gypsum treatment apparatus, FIG. 1(B) is a cross-sectional view of the apparatus taken along a line I-I of FIG. 1 (A), and FIG. 1(C) is a rear elevational view of the apparatus.

FIG. 2 is a horizontal cross-sectional view schematically showing the main constituents or components of the apparatus.

FIG. 3 is a vertical cross-sectional view schematically showing the main constituents or components of the apparatus.

FIG. 4 is a perspective view generally illustrating configurations of a calcined gypsum charging port and a humid gas-feeding port, as viewed from a cooling region.

FIG. 5 is a perspective view similar to FIG. 4, which illustrates an alternative configuration of the humid gas-feeding port.

FIG. 6 is a cross-sectional view conceptually showing a position of the humid gas-feeding port.

FIG. 7(A) is a cross-sectional view conceptually showing an arrangement in which a position of the calcined gypsum charging port is shifted with respect to a center axis of the cooling region, and FIG. 7(B) is another cross-sectional view conceptually showing another arrangement in which the calcined gypsum charging port is located at a position recessed from an end wall.

FIG. 8 is a cross-sectional view conceptually showing an arrangement in which the calcined gypsum charging port is positioned on an inner circumferential wall surface of a shell.

FIG. 9 is a cross-sectional view of the calcined gypsum charging port and the humid gas-feeding port schematically showing an alternative configuration of the calcined gypsum charging port shown in FIG. 5.

EMBODIMENT

According to a preferred embodiment of the present invention, the humid gas is a high temperature and high humidity gas produced in a calciner for calcination of gypsum and separated from the calcined gypsum; a calcined gypsum conveyance conduit for conveying the calcined gypsum is connected to a calcined gypsum supply device, including the calcined gypsum introduction port; and a humid gas delivery conduit for delivering the high temperature and high humidity gas separated from the calcined gypsum is in communication with the humid gas-feeding port. Preferably, the calcined gypsum introduction port has a circular profile; and the humid gas-feeding port is an annular opening concentrically surrounding the calcined gypsum introduction port, or the humid gas-feeding port is composed of a plurality of openings arranged in an annular formation around the the calcined gypsum introduction port. More preferably, the humid gas-feeding port is oriented to direct the spouted or delivered flow of the humid gas substantially in a direction in parallel with the center axis of the calcined gypsum introduction port, or in a direction converging with the center axis of the calcined gypsum introduction port.

In a preferred embodiment of the present invention, the cooler is an inner-tube-rotary type of multi-tubular cooler having an air-cooling type of heat exchanger. The cooler is provided with a rotary-agitator type of cylindrical shell defining the cooling region and an air-cooling type of heat exchanger, which uses air at an outdoor atmospheric air temperature, as its cooling medium. A center axis of rotation of the shell longitudinally extends, with its direction being inclined at a predetermined angle with respect to a horizontal plane. The calcined gypsum introduction port (calcined gypsum charging port) is located at one end portion or a proximal end portion of the shell, and the calcined gypsum introduced into the cooling region moves toward another end portion or a distal end portion of the shell in accordance with the inclination of the shell. Furthermore, the calcined gypsum supply device is a screw-feeder type of supply device that has a screw part driven in rotation to extrude the calcined gypsum toward the calcined gypsum introduction port. A humid gas-feeding device constituting the moisture supplying device is located so as to surround a cylindrical housing of the screw part. A humid gas passage in an annular form, which allows the humid gas delivery conduit to be in communication with the humid gas-feeding port, is formed in an outer peripheral zone of the screw part.

Preferably, the calcined gypsum charging port opens on an end wall on a side of a proximal end (an upstream side in an inclined direction), and the port is positioned concentrically with the center axis of the shell. The humid gas-feeding port also opens on the end wall on the side of the proximal end. Preferably, the humid gas-feeding port is positioned within a range of a circular or hemispherical area defined by a circle or hemisphere with a radius 1.5α (or 1 m), more preferably, a radius α (or 65 cm) so that the humid gas and the calcined gypsum are reliably and smoothly mixed and brought into contact with each other.

Preferably, the humid gas is saturated steam, superheated steam, mixture of steam and air, or gas containing moisture of at least a predetermined weight ratio. The superheated steam is a kind of dry gas, but it is considered that a rapid temperature drop and rapid pressure drop of the steam occurs immediately after the steam enters the cooling area so that the steam changes to a gaseous fluid that can emit the moisture. Therefore, in this specification, the humid gas is interpreted to include the superheated steam.

Preferably, the water content ratio of the humid gas is set to be in a range from 0.1 kg/kg' to 2.0 kg/kg', and the humid gas is introduced into the cooling region in a flow rate in a range from 0.3 wt % to 6.0 wt % (mass ratio) with respect to the weight of calcined gypsum introduced into the cooling region. Preferably, the humid gas flows into the cooling region from the humid gas-feeding port in a fluid velocity ranging from 5 m/s to 25 m/s.

In another preferred embodiment of the present invention, the humid gas is steam (or superheated steam) or mixture of steam and air, such as process steam or the like, used or shared in a factory or a plant in which the calcined gypsum treatment device is installed.

Example

With reference to the attached drawings, preferred examples of the present invention are described hereinafter.

FIG. 1(A) is a side elevational view showing an overall construction of a calcined gypsum treatment apparatus, FIG. 1(B) is a cross-sectional view of the apparatus taken along a line I-I of FIG. 1 (A), and FIG. 1(C) is a rear elevational view of the apparatus.

As shown in FIG. 1(A), the calcined gypsum treatment apparatus includes an inner-tube-rotary type of multi-tubular cooler 1 (referred to as "cooler 1" hereinafter). The cooler 1 is provided with a number of cooling tubes 2 arranged in a cylindrical shell 3. The tubes 2 constitute an air-cooling type of heat exchanger. The cooler 1 has a screw-feeder type of calcined gypsum supply device 10 that supplies a cooling region D of the cooler 1 with calcined gypsum G. The calcined gypsum treatment apparatus further includes a humid gas-feeding device 20. The device 20 introduces humid gas S, such as humid air containing a relatively large amount of water content, steam, water vapor, or the like (referred to as "humid gas S" hereinafter), directly into the cooling region D.

A center axis X-X of the cooler 1 is inclined at a predetermined angle with respect to a horizontal floor or ground surface J (horizontal surface). The calcined gypsum G before modified or reformed, which has a relatively high temperature and which is introduced into the shell 3 at a proximal end portion 3a of the shell 3, moves toward a distal end portion 3b, owing to an inclination of the shell 3. Thereafter, the calcined gypsum G is discharged through a discharge port 4 at the distal end portion 3b, as being the calcined gypsum Ga after being modified and cooled.

The cooler 1 has a rotary drive device 5 as schematically illustrated by imaginary lines, which rotates the shell 3 about the center axis X-X, at a predetermined rotational speed. The cooling region D in the shell 3 allows the calcined gypsum G to move toward the distal end portion 3b while being agitated in the shell 3.

Each of the cooling tubes 2 extends in parallel with the center axis X-X in the cooling region D and performs a rotational motion together with the shell 3. A distal end portion 2b of each of the tubes 2 opens to the outdoor atmospheric air on a distal end face of the shell 3 as shown in FIG. 1(C). As shown in FIG. 1(A), an exhaust manifold 6 is connected to the proximal end portion 3a of the shell 3. A proximal end portion 2a of each of the tubes 2 opens to a fluid passage in the manifold 6. The manifold 6 is connected to an exhaust fan (or an exhaust blower) Eb through an exhaust tube Ea. The suction pressure of the fan Eb acts on an intratubular area and the distal end portion 2b of each of the tubes 2 through the tube Ea and the manifold 6 so that each of the tubes 2 sucks the outdoor air (external environmental air) at an outdoor atmospheric temperature through the distal end portion 2b. The outdoor air entering the tubes 2 flows through the tubes 2 into the manifold 6, and then the air is exhausted out of the system by the fan Eb. The air flowing in the tube 2 and the calcined gypsum G in the cooling region D exchange heat through a tube wall of the tube 2 so that the calcined gypsum G is cooled. That is, the tubes 2 constitute the air-cooling type of heat exchanger using the outdoor air as a cooling medium, and the heated air is exhausted through the manifold 6 out of the system.

An exhaust port 7 for exhausting atmospheric gas in the shell 3 is provided at a top portion of the distal end portion 3b. The exhaust port 7 is connected to an exhaust fan or blower Fb through an exhaust fluid passage Fa. The suction pressure of the fan Fb acts on the cooling region D through the passage Fa and the port 7. The atmospheric gas in the cooling region D is exhausted out of the system by the fan Fb. If desired, a dust removing device Fc (shown by imaginary lines), such as a bag-filter, is provided on the passage Fa.

A cylindrical housing 11 of the calcined gypsum supply device 10 extends through the manifold 6 to be connected to the proximal end portion 3a. The device 10 comprises a driving device 12, such as an electric motor; a screw part 14 connected to a rotary drive shaft 13 of the device 12 in series; an input part 15 in a form of hopper into which the calcined gypsum G at a relatively high temperature is introduced; and a calcined gypsum charging port 16 with a circular profile that opens to the cooling region D for charging the calcined gypsum G into the area D. The port 16 defines the aforementioned "calcined gypsum introduction port" for introducing the calcined gypsum into the cooling region D. A center axis of each of the screw part 14 and the charging port 16 coincides with the center axis X-X of the shell 3. A calcined gypsum feeding conduit 17 is connected to the input part 15. A calciner for calcining raw gypsum (not shown) is connected to the conduit 17. The calcined gypsum of the calciner is fed to the screw part 14 through the conduit 17 and the input part 15. The rotating screw part 14 extrudes the calcined gypsum G into the cooling region D through the port 16 so that the calcined gypsum G is introduced into the cooling region D, as shown by an arrow.

The humid gas-feeding device 20 feeds the humid gas directly to the cooling region D, wherein the humid gas is required for modifying or reforming the calcined gypsum by incorporation of moisture into the calcined gypsum. As set forth above, the modification or reforming of the calcined gypsum by the incorporation of moisture into the calcined gypsum is intended to reduce the amount of mixing water for slurrying the calcined gypsum or to prevent the amount of mixing water therefor from increasing.

FIGS. 2 and 3 are a horizontal cross-sectional view and a vertical cross-sectional view, which schematically show the main constituents or components of the calcined gypsum treatment apparatus. FIG. 4 is a perspective view generally illustrating configurations of the calcined gypsum charging port 16 and a humid gas-feeding port 22, as viewed from the cooling region D. FIG. 5 is a perspective view similar to FIG. 4, which illustrates an alternative configuration of the port 22.

As shown in FIGS. 2 and 3, the humid gas-feeding device 20 is provided with a cylindrical housing 21 enclosing the housing 11 of the calcined gypsum supply device 10 and the humid gas-feeding port 22 in an annular form located outside of the port 16 so as to surround the port 16. An annular humid gas passage 25 is formed between the housings 21, 11. The passage 25 is in communication with the port 22. A humid gas delivery conduit 23 is connected to the housing 21 so as to introduce the humid gas S into the passage 25. An upstream end of the conduit 23 is connected to a supply source of the humid gas (not shown).

As the humid gas S, moist air or high humidity gas produced in a calciner (not shown), such as process gas of the calciner; steam, such as process steam commonly available in a whole plant; a mixture of steam and air, or the like may be preferably used. For example, in a case where the calciner is used as the supply source of the humid gas, the high temperature and high humidity gas (process gas) generated in a calcination furnace or reactor of the calciner is separated from the calcined gypsum by a dust remover, such as a filter unit (not shown), and the gas is delivered through a fluid passage or intratubular passage in the conduit 23 to the passage 25, as the humid gas S.

In FIGS. 2 and 3, a flow of air (cooling medium) passing through each of the tubes 2 is indicated by a thin solid line arrow mark ("Air"). Furthermore, in each of FIGS. 2 and 3, a flowing direction of the calcined gypsum G charged into the input part 15 is indicated by a thick void arrow mark ("G"), and a flowing direction of the humid gas S fed to the humid gas-feeding device 20 is indicated by a thick black arrow mark ("S").

The air at the outdoor atmospheric temperature T1 (e.g., 20 degrees C.) flowing into each of the tubes 2 is heated up to a temperature T2 (e.g., 60 degrees C.) by heat exchange with the calcined gypsum G in the cooling region D. The heated air flows into the manifold 6, and then the air is exhausted out of the system by the exhaust fan Eb (FIG. 1). The calcined gypsum G fed to the calcined gypsum supply device 10 has a temperature T3, e.g., approximately 150 degrees C. (the material temperature). The calcined gypsum G is cooled by heat exchange with the air flowing in the tubes 2. The calcined gypsum G discharged through the discharge port 4 has a temperature T4, e.g., approximately 80 degrees C.

A temperature T5 of the humid gas S fed to the device 20 is, preferably, a temperature in a range from 100 degrees C. to 200 degrees C., e.g., approximately 150 degrees C. The humid gas S is spouted or delivered to the cooling region D through the humid gas-feeding port 22. That is, the gas S is directly introduced into the cooling region D. Preferably, the gas S has a water content (absolute humidity) in a range between 0.1 kg/kg' and 0.2 kg/kg'. The gas S is introduced into the cooling region, in a flow rate ratio between 0.3 wt % and 6.0 wt % (mass ratio) with respect to the calcined gypsum introduced into the cooling region. For instance, in a case where a supply rate of the calcined gypsum by the calcined gypsum supply device 10 is set to be 50 tons/h, the gas S supplies the cooling region D with the water content in a rate ranging from 500 kg/h to 1500 kg/h (the ratio between 1.0 wt % and 3.0 wt %). Preferably, the gas S flows into the cooling region D through the port 22 in the velocity of flow ranging from 5 m/s to 25 m/s (e.g., 10 m/s or 20 m/s).

The calcined gypsum G is agitated in the cooling region D by rotation of the shell 3. The humid gas S entering the cooling region D is mixed with and brought into contact with many gypsum particles of the calcined gypsum G, rapidly and efficiently. The calcined gypsum G absorbs the water or moisture contained in the gas S, whereby the gypsum G is modified to have a composition, components, physical properties or nature that may result in reduction of the mixing water for slurrying the calcined gypsum (or prevention of increase of the mixing water therefor). The gypsum thus modified is discharged through the discharge port 4.

In FIG. 4, there are illustrated the arrangements of the calcined gypsum charging port 16 and the humid gas-feeding port 22, and the positional relation between the ports 16, 22. Both the ports 16, 22 open on an end wall 8 of the cooling region D. The port 16 is an opening having a circular profile (a true circle) with a diameter a. The port 22 is an annular opening, which is positioned in an outer peripheral zone of the port 16 concentrically therewith. The port 22 extends in an annular zonal formation about the center axis X-X, as a zonal opening with a width $\gamma$. An annular buffer zone 9 is provided between a peripheral circumferential edge of the port 16 and an inner circumferential edge of the port 22. A width $\eta$ of the buffer zone 9 may be preferably set to be a value ranging from $0.3\gamma$ to $3.0\gamma$ (more preferably, a value ranging from $0.5\gamma$ to $2.5\gamma$) with respect to the width $\gamma$ of the port 22.

The port 22 delivers or ejects the delivered or spouted flow of the humid gas S directly to the cooling region D; therefore, the moisture content (steam) included in the gas S can be prevented from condensing in a conveyance route for transportation of the calcined gypsum G. Thus, it is possible to reliably avoid generation of water condensation in the conveyance route for transportation of the calcined gypsum G. Further, the port 22 delivers or ejects the gas S in the vicinity of the port 16; therefore, the gas S is mixed with and brought into contact with the many gypsum particles of the calcined gypsum G, surely and smoothly. The spouted flow or delivered flow of the gas S, which is released to the cooling region with a relatively large volume, is brought into contact with the relatively many gypsum particles of the calcined gypsum G rapidly and efficiently; therefore, the moisture of the gas S is given to the calcined gypsum G effectively. Thus, the efficiency in the incorporation of moisture into the calcined gypsum G is improved, and the dew condensation of excess water can be prevented from taking place in the cooling region D.

As set forth above, the port 22 shown in FIG. 4 is the annular zonal opening extending around the port 16. Alternatively, a number of the ports 22 may be disposed around the port 16. In FIG. 5, a number of the ports 22 are illustrated, each being a circular opening with a relatively small diameter wherein the ports 22 spaced at an equal distance from each other are arranged around the port 12.

Branch pipes 23a, which branch from the humid gas delivery conduit 23, are connected to the ports 22 as shown in FIG. 5, respectively. The respective ports 22 simultaneously deliver or eject the delivered or spouted flows of the humid gas S to the cooling region D.

FIG. 6 is a cross-sectional view showing the position of the port 22 conceptually. In FIG. 6, the ports 22 is illustrated as a lot of openings, each having a small diameter. The ports 22 are disposed in a formation similar to that shown in FIG. 5, but the ports 22 may be an annular opening as shown in FIG. 4, or an opening with another configuration.

The port 22 is preferably positioned in the vicinity of the port 16 in order to allow the gas S to be mixed with and brought into contact with the calcined gypsum G certainly and smoothly. Preferably, the port 22 is positioned in a range of a circular area defined by a circle with a radius $1.5\alpha$, more preferably a radius $\alpha$, about a center $\beta$ of the port 16 wherein the dimension $\alpha$ is a diameter or a maximum dimension of the port 16.

The port 22 may be located at a position protruding from the end wall 8, as shown by dotted lines in FIG. 6. In such an arrangement, the port 22 is preferably positioned in a range of a hemispherical area with the radius $1.5\alpha$, preferably the radius $\alpha$, about the center $\beta$ of the port 16.

FIG. 7(A) is a cross-sectional view showing another preferable position of the port 22 conceptually wherein the cooler 1 has a center axis X'-X' of the port 16 shifted from the center axis X-X. Furthermore, FIG. 7(B) is a cross-sectional view showing yet another preferable position of the port 22 conceptually wherein the cooling device has the port 16 located at a position recessed from the end wall 8.

As shown in FIG. 7(A), the center axis X'-X' of the port 16 may be located at the position shifted from the center axis X-X. Further, as shown in FIG. 7(B), the end wall 8 may be partially recessed on a side of a proximal end and the port 16 may be located in a position recessed from the end wall 8. Also in such an arrangement, the port 22 is preferably positioned in a range of the circular or hemispherical area with the radius $1.5\alpha$, preferably the radius $\alpha$, about the center $\beta$ of the port 16.

FIG. 8 is a cross-sectional view showing the position of the port 22 conceptually wherein the cooler 1 has the port 16 on an inner circumferential wall surface of the shell 3.

As shown in FIG. 8, the port 16 may be positioned on the inner circumferential wall surface of the shell 3. Also in such an arrangement, the port 22 is preferably positioned in a range of the circular or hemispherical area with the radius $1.5\alpha$, preferably the radius $\alpha$, about the center $\beta$ of the port 16.

FIG. 9 is a cross-sectional view showing an alternative configuration of the port 22 shown in FIG. 5.

A direction of a straight flow of the humid gas delivered or ejected by the port 22 may not be inevitably oriented in parallel with the axis X-X, X'-X'. For example, the center axis of the port 22 may be oriented in a direction of an angle $\theta$ with respect to the axis X-X, X'-X'. Preferably, the angle $\theta$ is set to be such an angle that the port 22 delivers or ejects the straight flow of the humid gas in a direction converging with the axis X-X, X'-X'.

Although the present invention has been described as to the preferred embodiments and examples, the present invention is not limited thereto, but may be carried out in any of various changes or variations without departing from the scope of the invention as defined in the accompanying claims.

For instance, the cooler in each of the aforementioned examples is a rotary-agitator type of cooler that agitates the calcined gypsum in the shell by rotation of the shell. However, the cooler may be another type of cooler, such as a paddle-agitator type, a screw-agitator type, or a disc-agitator type.

Furthermore, in the aforementioned examples, the humid gas of the calciner, the process steam and so forth are exemplified as the humid gas, but the humid gas is not limited to the gas of such a supply source. For instance, the humid gas of an arbitrary supply source, such as the humid gas exhausted from a predryer for raw gypsum, or the humid gas exhausted from a dryer for gypsum based products, may be used.

In addition, in the aforementioned examples, the system has the cooling region of the cooler used as a modifying area of the calcined gypsum wherein the system is arranged to cool the calcined gypsum by the cooler, immediately after calcining the gypsum by the calciner. However, the calcined gypsum to be modified is not inevitably the calcined gypsum immediately after calcined. For instance, it may be the calcined gypsum after cooled to some extent. Also, the cooler may be arranged to be a cooling and drying device that has a cooling and drying area for further cooling and drying the calcined gypsum already cooled to some extent.

INDUSTRIAL APPLICABILITY

The present invention is applicable to a calcined gypsum treatment device and a calcined gypsum treatment method and, especially, such an apparatus and method for supplying the calcined gypsum with moisture so as to incorporate moisture into the calcined gypsum for modifying it.

According to the present invention, in a process for modifying the calcined gypsum by the incorporation of moisture into the calcined gypsum, dew condensation water can be reliably prevented from being produced in an area of contact between the calcined gypsum and the moisture, a conveyance passage for transportation of the modified calcined gypsum, or the like, and in addition, efficiency for the incorporation of moisture into the calcined gypsum can be improved; therefore, the practical advantage of this invention is remarkable.

LIST OF REFERENCE NUMERALS 1 cooler
2 cooling tube
3 cylindrical shell
4 discharge port
5 rotary drive device
6 exhaust manifold
7 exhaust port
10 calcined gypsum supply device
11 cylindrical housing
14 screw part
16 calcined gypsum charging port
20 humid gas-feeding device
21 cylindrical housing
22 humid gas-feeding port
25 humid gas-feeding passage
D cooling region
G calcined gypsum (before modified)
Ga calcined gypsum (after modified)
S humid gas
X-X, X'-X' center axis

The invention claimed is:

1. A calcined gypsum treatment apparatus, which has a moisture supplying device for incorporating moisture into calcined gypsum and an agitating type of cooler provided with a cooling region for cooling the calcined gypsum;
    wherein said moisture supplying device includes a humid gas-feeding port which introduces a spouted flow or delivered flow of humid gas, including moisture or steam, directly into the cooling region;
    wherein said cooler is provided with a calcined gypsum introduction port for introducing the calcined gypsum into said cooling region; and
    wherein said humid gas-feeding port is positioned in vicinity to said calcined gypsum introduction port so as to cause said spouted or delivered flow of the humid gas to be brought into contact with said calcined gypsum immediately after being introduced into said cooling region.

2. The apparatus as defined in claim 1, wherein said humid gas is a high temperature and high humidity gas produced in a calciner for calcination of said calcined gypsum and separated from the calcined gypsum; said cooler has a calcined gypsum supply device including the calcined gypsum introduction port; a calcined gypsum conveyance conduit, which conveys the calcined gypsum, is connected to the calcined gypsum supply device; and a humid gas delivery conduit for delivering said high temperature and high humidity gas is in communication with said humid gas-feeding port.

3. The apparatus as defined in claim 1, wherein said cooler is a multi-tubular cooler which has a rotary-agitator type of cylindrical shell defining said cooling region and an air-cooling type of heat exchanger using air as a cooling medium; a center axis of rotation of said shell extends longitudinally and is inclined at a predetermined angle with respect to a horizontal plane; said calcined gypsum introduction port is located at one end portion or a proximal end portion of said shell; and the calcined gypsum introduced into said cooling region moves toward another end portion or a distal end portion of said shell in accordance with an inclination of the shell.

4. The apparatus as defined in claim 1, wherein said humid gas-feeding port is positioned in a range of a circular or hemispherical area having a radius $1.5\alpha$ about a center ($\beta$) of said calcined gypsum introduction port, with respect to a diameter or maximum size of the calcined gypsum introduction port, where the diameter or maximum size is represented by $\alpha$.

5. The apparatus as defined in claim 1, wherein said calcined gypsum introduction port has a circular profile; and said humid gas-feeding port is an annular opening concentrically surrounding the calcined gypsum introduction port, or a plurality of openings arranged in an annular formation around the calcined gypsum introduction port.

6. The apparatus as defined in claim 2, wherein said calcined gypsum supply device is a screw-feeder type of calcined gypsum supply device which has a screw part driven in rotation to extrude the calcined gypsum toward said calcined gypsum introduction port; said moisture supplying device has a humid gas-feeding device located so as to surround a cylindrical housing of said screw part; the humid gas-feeding device has a humid gas passage through which said humid gas delivery conduit is in communication with said humid gas-feeding port; and the humid gas passage is a fluid passage having an annular cross-section, which is formed in an outer peripheral zone of said screw part.

7. The apparatus as defined in claim 1, wherein said humid gas-feeding port is oriented to direct said spouted or delivered flow substantially in a direction in parallel with a center axis of the calcined gypsum introduction port, or in a direction converging with the center axis thereof.

* * * * *